United States Patent [19]
Wersing et al.

[11] Patent Number: 5,629,103
[45] Date of Patent: May 13, 1997

[54] HIGH-TEMPERATURE FUEL CELL WITH IMPROVED SOLID-ELECTROLYTE/ ELECTRODE INTERFACE AND METHOD OF PRODUCING THE INTERFACE

[75] Inventors: Wolfram Wersing, Kirchheim; Ellen Ivers-Tiffee, München; Harald Landes, Rückersdorf; Ruth Männer, Oberpframmern; Christoph Nölscher, Nürnberg; Harald Schmidt, München; Manfred Schnöller, Haimhausen, all of Germany

[73] Assignee: Siemens Aktiengesellschaft, Munich, Germany

[21] Appl. No.: 535,240
[22] PCT Filed: Apr. 18, 1994
[86] PCT No.: PCT/DE94/00425
§ 371 Date: Oct. 27, 1995
§ 102(e) Date: Oct. 27, 1995
[87] PCT Pub. No.: WO94/25994
PCT Pub. Date: Nov. 10, 1994

[30] Foreign Application Priority Data
Apr. 30, 1993 [DE] Germany ............ 43 14 323.7

[51] Int. Cl.$^6$ ...................................... H01M 8/10
[52] U.S. Cl. .................. 429/33; 429/30; 429/32; 429/34
[58] Field of Search .............. 429/30, 32, 34, 429/33, 41

[56] References Cited

U.S. PATENT DOCUMENTS

| | | |
|---|---|---|
| 3,442,713 | 5/1969 | Tanneuberger et al. |
| 4,462,891 | 7/1984 | Lawless .................. 204/427 |
| 4,477,487 | 10/1984 | Kojima et al. |
| 4,957,673 | 9/1990 | Schroeder et al. |
| 5,034,288 | 7/1991 | Bossel .................. 429/32 |
| 5,035,961 | 7/1991 | Riley. |
| 5,356,730 | 10/1994 | Minh et al. .................. 429/32 |

FOREIGN PATENT DOCUMENTS

| | | |
|---|---|---|
| 0439938 | 8/1991 | European Pat. Off. |
| 1513796 | 2/1968 | France. |
| 1313856 | 12/1989 | Japan. |
| 3095864 | 4/1991 | Japan. |
| 3134963 | 6/1991 | Japan. |
| 3147264 | 6/1991 | Japan. |
| 3147268 | 6/1991 | Japan. |
| 3222206 | 10/1991 | Japan. |
| 3285266 | 12/1991 | Japan. |
| 4101361 | 4/1992 | Japan. |
| 4190564 | 7/1992 | Japan. |

OTHER PUBLICATIONS

Patent Abstract of Japan vol. 16, Jul. 1992 JP 04 101 361 Jul. 1992.
Chemical Abstract No. 100909y, vol. 113, No. 12, 17 Sep. 1990, Mihara et al, "Solid-electrolyte fuel-cell electrode units, their manufacture and the fuel cells", p. 218.
Chemical Abstract No. 186776d, vol. 115, No. 18, 4 Nov. 1991, Akyama et al, "Solid-electrolyte fuel cells", p. 207.
Chemical Abstract No. 211854n, vol. 115, No. 20, 18 Nov. 1991, Nagata et al, "Manufacture of solid-electrolyte fuel cells", p. 232.
Chemical Abstract No. 8794w, vol. 116, No. 2, 13 Jan. 1992, Nishihara, "Solid-electrolyte fuel cells", p. 131.
Chemical Abstract No. 44136s, vol. 116, No. 6, 10 Feb. 1992, Akiyama et al, "Solid-electrolyte fuel cells", p. 156.
Chemical Abstract No. 155497e, vol. 116, No. 16, 20 Apr. 1992, Yoshida et al, "High-temperature solid-electrolyte fuel cells", p. 220.
Chemical Abstract No. 73201k, vol. 117, No. 8, 24 Aug. 1992, Akiyama et al, "Solid-electrolyte fuel cells", p. 204.

Primary Examiner—M. Nuzzolillo
Attorney, Agent, or Firm—Hill, Steadman & Simpson

[57] ABSTRACT

To improve stability and efficiency of a high-temperature solid-electrolyte fuel cell of planar multilayer design, it is proposed to increase the effective interface between the electrolyte layer and an electrode layer. This is achieved by a suitably treated surface of the electrolyte layer or by a porous and/or rough interlayer.

14 Claims, 1 Drawing Sheet

HIGH-TEMPERATURE FUEL CELL WITH IMPROVED SOLID-ELECTROLYTE/ ELECTRODE INTERFACE AND METHOD OF PRODUCING THE INTERFACE

BACKGROUND OF THE INVENTION

In a high-temperature solid-electrolyte fuel cell, the combustion reaction of a gaseous fuel with air is carried out electrochemically. The redox reaction takes place in the vicinity of the solid electrolyte which is provided with electrodes on both sides. Fuel molecules are oxidized by releasing electrons, while the oxygen is reduced on the other side of the solid electrolyte by absorbing electrons. The solid electrolyte separates the coreactants, prevents an electrical short circuit and provides for a substance equilibration since it has a high conductivity for ions accompanied at the same time by low conductivity for electrons.

Known high-temperature fuel cells have a solid electrolyte composed of fully stabilized yttrium-stabilized zirconium oxide (YSZ) which has an adequate ion conductivity at approximately 950° C., at which conductivity the fuel cell can be operated with sufficiently low internal losses.

In order to obtain an operating voltage exceeding the potential difference of a single cell at the working point of the fuel cell, a plurality of fuel cells are connected in series. In the planar fuel-cell stack concept, this is done in a simple manner by stacking individual fuel cells one on top of the other, intervening bipolar layers and plates composed of a so-called ICM material (interconnection material) ensuring the sealing of the gas spaces and the electrical connection between two adjacent individual cells.

In implementing the planar fuel-cell concept, a few important problems still occur which have hitherto made the economical use of high-temperature fuel cells difficult. Thus, there is a problem, for example, in the selection of the materials which are used for the fuel cells and which have to withstand the high operating temperatures of up to approximately 1100° C. accompanied at the same time by high pressures of the fuel gas or of the oxygen needed for the combustion of up to 16 bar. As a result of the high operating temperatures, chemical and physical processes which endanger the long-term stability of the high-temperature fuel cell set in, particularly at the interfaces between two adjacent layers of different composition. As a result of interdiffusion between individual layers, the chemical composition of the layer materials alters and, consequently, so also do their properties. As a result of sintering and recrystallization processes, particularly in the cermet (=ceramic metal) used as anode material, both the electrochemical activity and the stability or service life of the high-temperature fuel cell decrease.

A further problem is to join both individual fuel cells and entire fuel-cell stacks together in a manner which is gastight with respect to the high operating temperatures and the high pressure.

SUMMARY OF THE INVENTION

The object of the present invention is therefore to provide a high-temperature fuel cell having increased long-term stability, higher current density and gastight joining capability.

According to the invention, this object is achieved by a high-temperature fuel cell, which has, in particular, an improved interface between electrolyte layer and electrode layer.

In general terms the present invention is a high-temperature solid-electrolyte fuel cell of planar multilayer design having ceramic films formed as gas-transport, electrode and electrolyte layers. In the cell the electrolyte layer is embedded between two electrode layers and has an anode side and a cathode side. An electronically and ionically conducting interlayer having increased surface is provided between the electrolyte layer and at least one electrode layer. The interlayer on the anode side is selected from titanium-doped or niobium-doped zirconium oxide and niobium-doped or gadolinium-doped cerium oxide. An approximately 1 to 3 µm thick interlayer composed of an ionically and electronically conducting cathode material is provided on the cathode side.

Advantageous developments of the present invention are as follows.

The interlayer is disconnected from the remaining layer region in the join region of the electrolyte layer and serves to receive the solder in constructing a high-temperature fuel-cell stack.

In general terms the present invention is also a method of producing a multilayer structure composed of an electrolyte layer provided on both sides with an electrode (anode layer and cathode layer, respectively) for a planar high-temperature solid-electrolyte fuel cell. A ceramic interlayer, which has an increased surface and which is composed of an ionically and electronically conducting material, is applied to at least one smooth surface of the electrolyte layer. The anode layer or cathode layer is applied on top of the interlayer. The interlayer and the electrode layer are jointly sintered. The interlayer on the anode side is selected from titanium-doped or niobium-doped zirconium oxide and niobium-doped or gadolinium-doped cerium oxide. The interlayer on the cathode side is formed from an ionically and electronically conducting cathode material.

Advantageous developments of the method of the present invention are as follows.

A porous interlayer composed of yttrium-stabilized, titanium-doped or niobium-doped zirconium oxide is produced between the electrolyte layer and the anode layer, and is subsequently impregnated with nickel in the pores.

The impregnation of the pores is carried out by chemical or electrochemical methods.

The impregnation is carried out in an atmosphere containing gaseous nickel compounds.

Particles composed of a material which can be burned out are incorporated in the ceramic interlayer. These particles are burned out again by sintering, in which process the surface of the interlayer is increased.

The interlayer is applied by a sol/gel method and is made to "break up" by calcination and sintering, in which process the surface of the interlayer is increased.

The interlayer is applied by screen printing.

The interlayer is applied in a thickness of 1–10 particle layers (not more than approximately 10 µm).

The invention improves the effective and electrochemically active interface between the electrolyte layer and an electrode layer and solves a number of problems which occur at that point. The essential idea of the invention is to increase the interface between the layers by suitable measures. Hitherto, the objective has always been to configure the surface of the electrolyte layer, like that of the other layers, as smoothly as possible in order to achieve a good joining capability of said layers to form the fuel-cell stack. The smooth surface was also intended to keep the interface as small as possible in order to reduce the interface problems. The invention now offers a high-temperature fuel cell in which the problems cited are solved, surprisingly, by an increased interface.

In one version of the invention, the effective interface is increased by an ion-conducting interlayer of suitable geometry. Such an interlayer may have, for example, a rough or porous surface.

In the simplest case, the interlayer comprises the same material as the electrolyte substrate, that is to say, for example, fully stabilized YSZ. Although the interlayer is, strictly speaking, part of the surface of the electrolyte layer, it does not have to fulfill all the properties which are imposed on a solid electrolyte in a high-temperature fuel cell. Other ion-conducting materials which would be unsuitable per se as sole material for the electrolyte layer are therefore also suitable. In addition to the YSZ already mentioned, the interlayer may also comprise titanium-doped or niobium-doped zirconium oxide. Niobium-doped cerium oxide is also suitable, in particular, for the anode side.

A particularly effective interface between electrolyte and anode layer is achieved with a porous interlayer which is composed of YSZ and which already has anode properties and, for example, is impregnated with nickel in the pores or coated.

In a corresponding manner, the interlayer on the cathode side the electrolyte layer may comprise a thin (thickness approximately 1 to 3 µm) and gastight layer composed of ion-conducting cathode material.

If the interlayer with increased surface is used, an electrolyte layer having a smooth surface may be used as hitherto since the additional interface is provided solely by the interlayer. It is, however, also possible to increase the surface of the electrolyte layer itself, for example by forming a surface structure or by roughening the surface. In addition, a roughened electrolyte surface may be combined with an interlayer.

An increased stability of the interfaces with respect to recrystallization processes, in particular on the anode side, is achieved with a roughened surface of the electrolyte layer. In the anode layer and particularly at the interface between electrolyte layer and anode layer, the number of triple points is of importance for the efficiency of the electrochemical conversion. Triple points are places at which a gas volume comes into contact with regions of electronic and ionic conductance. Triple points are therefore always at a surface of the cermet (which surface is also internal) and are at that point at the interface between the ceramic and metal. When the cermet is thermally stressed, recrystallization processes may result in the increase of the grains and, consequently, in the reduction of the number of triple points. In a rough electrolyte surface in accordance with the present invention, the metallic particles, in particular, of the cermet anode layer are embedded in superficial depressions and thus prevented from growing. The number of triple points therefore decreases as a result of the invention only more slowly or not at all and thus increases the long-term stability of the internal structure at the electrolyte and its interfaces so that a drop in performance, due thereto, of all the fuel cells is also reduced or even prevented during the operating period.

The best solution is, however, an interlayer which has a large surface and is both electronically and ionically conducting. In this case, any point of the surface of such an interlayer has the same action as a triple point. A material which is both ionically and electronically conducting is, for example, gadolinium-doped cerium oxide.

The means of increasing the interface may be provided both at the interface with the anode layer and—though comprising another suitable material—at the interface with the cathode layer or at both interfaces.

A number of methods are available for increasing the interfaces between electrolyte layer and electrode layer. An increased surface of the electrolyte layer can be achieved during the production of the electrolyte layer itself or not until at a later stage. For example, it is possible to produce the electrolyte layer by film casting on a prestructured surface. In the simplest case, said surface is one of the electrode layers which inherently already have a roughened and, consequently, increased surface because of their porosity. It is also possible to apply the electrolyte layer on top of a suitably prestructured shaped piece which can later be removed again, for example by peeling, or which is a so-called dead mould (lost wax). Such a shaped piece composed, for example, of plastics material is burnt off, evaporated or removed by melting no later than during the sintering operation.

In order to structure both surfaces of the electrolyte layer in this way, two parts may be produced in the way just described and joined together, for example, as green films.

A further embodiment envisages impressing a structure on the electrolyte layer on one or both sides. This can be done mechanically using a suitably prestructured die, for example after film casting.

A particularly fine structuring and, consequently, a particularly large surface of the electrolyte layer can be obtained if the electrolyte layer is first produced with a smooth surface and then structured with the aid of a photoresist mask. For this purpose, the electrolyte layer is coated with a photoresist, the desired structure is produced in the photoresist layer by exposure to light and subsequent development, the surface is eroded through the photoresist mask and the photoresist mask is finally removed again. The erosion can be carried out by chemical etching (wet-chemically or in the gas phase), in an etching plasma or mechanically.

The interlayer is applied by known methods to the electrolyte layer. Powdered starting materials for the interlayer are processed with a binder to form a printable paste and applied to the electrolyte layer, for example, with the aid of a screen printing process. The desired porosity or surface roughness can be achieved by mixing the powdered starting substances with, for example, spherules which comprise plastics material and which burn off during sintering, pores of the size of the spherules being left behind in the ceramic layer. It is also possible to dimension the proportion of the binder so that, during sintering of a printed-on or otherwise applied paste, a porous (inter)layer is left behind.

A further possibility for producing a porous interlayer is to apply it by the sol/gel method. The sol containing the components of the interlayer in dissolved form is applied by known methods, for example by spin coating or by spray coating. An appropriately thin layer applied as sol can likewise be converted into a porous layer as a result of the volume shrinkage during calcination or during sintering.

A further possibility is to apply the interlayer by means of an EVD method.

All the application methods for the interlayer can optionally be applied to an already sintered electrolyte layer or to a still unsintered ceramic film for the electrolyte layer. In addition, the interlayers can be sintered separately or jointly with the electrodes.

A desired surface roughness or porosity of the interlayer can also be achieved or enhanced at a later stage if a heterogeneous composition is chosen for the interlayer. For example, the starting point may be a powdered starting material which comprises different particles A and B. After the application of this layer as already described, the particles A and B can be eroded differently using a suitable erosion method. For example, for this purpose, a normal smooth layer may first be applied. After said layer has been sintered, it is eroded in an etching process or under a suitable etching plasma. It is also possible to carry out the erosion mechanically, for example by sandblasting, brushing or grinding.

Regardless of the composition of the interlayer, it can be structured, and consequently provided with an increased and roughened surface, by photolithographic structuring with the aid of a photoresist mask and a suitable erosion method.

A suitable interlayer for the anode side of the electrolyte layer comprises, for example, an activated or stabilized zirconium oxide layer which is doped, for example, with titanium or niobium, produced porously by the methods specified and impregnated with nickel in the pores at a later stage. This impregnation can be carried out by chemical or electrochemical deposition. Such a deposition is particularly simple if metallic nuclei, for example nickel particles, are already present in the porous zirconium oxide layer. The nuclei can be as small as desired and also comprise other metals, for example palladium. The nuclei are enhanced by the deposition.

A further method of impregnation is possible by chemical deposition from the gas phase as a result of decomposition of a volatile nickel compound, or also from a nickel suspension.

The anode cermet is then deposited in a known way, for example by a screen printing method, on the interlayer, impregnated with nickel in this way, on top of the electrolyte layer.

In order to obtain the structure of said interlayer already containing metallic nickel and not to load it unnecessarily by means of a redox process, the baking in of the anode and of the separately or jointly applied cathode is carried out, according to the invention, not in oxygen or air, but in an atmosphere having lower oxygen partial pressure. In order not to damage the cathode layer during this process, however, the oxygen partial pressure should be equal to or greater than 10—10 MPa. This achieves the result that the nickel/YSZ interfaces are not impaired in the region of the interlayer by a complete oxidation of the nickel to nickel oxide during baking-in and by the subsequent reduction during operation of the high-temperature fuel cell.

In a further aspect of the invention, the porous interlayer is applied after the application of the electrode layer. Since the electrode layer is permeable to gas and therefore porous, it is readily possible, for example, to apply dropwise to an already sintered electrode layer a sol which contains components suitable for the interlayer and which can penetrate down to the dense electrolyte layer. In a spin-coating method, the sol is distributed uniformly at the electrolyte/electrode layer interface. If the amount of sol is suitably dimensioned, a thin sol/gel layer of this type can be produced which breaks up in the subsequent calcination and sintering process because of the volume shrinkage and becomes porous in the process.

With each of the interlayers mentioned and described, which are either porous and/or superficially roughened or are provided with a topological structure on the surface, a further advantage is achieved on joining the high-temperature fuel cell together. For this purpose it is indeed necessary to apply the interlayer, but not the electrode layer applied on top thereof in the peripheral region of the ceramic plate forming the electrolyte layer. These peripheral regions which remain free from electrode material form the joining edge of the high-temperature fuel cell, which edge is coated with a glass solder for sealing purposes. The latter is a sinterable paste which contains glass particles and whose composition is adjusted so that it wets the material of the interlayer well. When the components of the high-temperature fuel cell are finally sintered together, for which purpose, in addition to the electrolyte layer coated with electrodes, gas-transport layers and bipolar plates are also needed to separate the individual cells, the solder is fixed in the join region by the capillary forces occurring at the surface of the interlayer. Creepage of the solder along the electrolyte layer, which was observed in the electrolyte layer with smooth surface hitherto used, is prevented in this way. The better adhesion of the solder to the interlayer due to the capillary forces also ensures a better and stable sealing of the high-temperature fuel cell.

The solder can also be introduced after the components of the fuel cell have been sintered together. For this purpose, a material which is stiff at soldering temperature and is composed of solder and YSZ powder is introduced into the join region instead of the pure solder. The powder matrix interlocks with the roughened surface of the interlayer and fixes the latter. The capillary forces prevent the solder from leaving the YSZ-powder matrix.

The advantage of improved joining capability by means of the glass solder is, as with the interlayer, also achieved with a roughened surface of the electrolyte layer.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 2 shows the same arrangement with an interlayer, while

DESCRIPTION OF THE PREFERRED EMBODIMENTS

Figure 1:
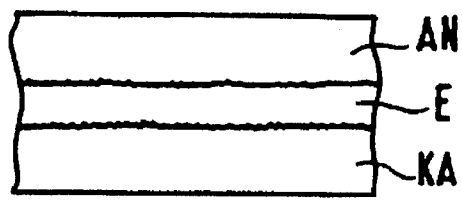
FIG. 1 shows a diagrammatic cross section of an electrolyte layer embedded in accordance with the invention between two electrode layers.

FIG. 1 shows an electrolyte layer E with a surface which is increased in accordance with the invention. It conventionally comprises fully stabilized YSZ and is produced by processes known per se. In principle, however, still other ion-conducting materials are suitable in addition to YSZ provided that they can be sintered in a gastight manner and their electron conductance is negligible. Furthermore, it must be stable under the operating conditions of the high-temperature fuel cell, for example at 900° C. and 15 bar pressure both of a reducing and of an oxidizing atmosphere. A further requirement is mechanical robustness, which is required at least in connection with the electrode layers. A suitable thickness of the electrolyte layer E, which is technologically feasible, is 10 to 15 µm. Generally, however, it is desirable to make the electrolyte layer E as thin as possible in order to keep the voltage dropping across it, and consequently the power loss, as low as possible.

Conventionally, a cermet composed of nickel and YSZ serves as material for the anode layer. This can be processed with a suitable binder to form a paste and printed onto the electrolyte layer E. An optimum anode layer AN has a porous structure in which ceramic, nickel and pores each form a third of the volume. The layer thickness of the anode layer AN is conventionally in the range from 50 to 200 μm.

The cathode layer KA to be applied to the other side of the electrolyte layer E comprises a mixed oxide of the ABO3 type selected from the Perovskite group, in which the components A and B are each formed by an element or are a stoichiometrically exact mixture of a plurality of cations. For example, A may be selected from lanthanum, strontium and calcium, while B may stand for manganese, cobalt or nickel.

The cathode layer KA is also conventionally printed on, but it can also be produced separately as a green film and joined to the electrolyte layer E at a later stage. The cathode layer KA is both ion-conducting and electron-conducting and has a thickness comparable to the anode layer AN.

The electrode layers AN and KA can be joined to a green electrolyte film and sintered together to form a composite. It is also possible, however, to sinter the electrolyte layer E separately, provide it with the electrode layers AN and KA and to sinter it yet again as a composite. A further possibility is only to sinter said composite together in the finally assembled fuel-cell stack.

Figure 2:
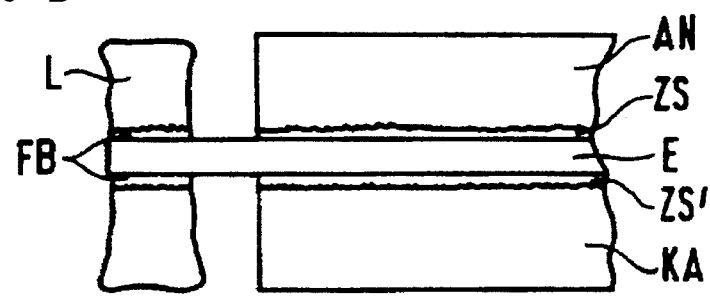

FIG. 2 shows the version of the invention in which the electrolyte layer E may have a smooth surface but is provided, on the other hand, with an interlayer ZS which is rendered porous by a suitable aftertreatment, roughened or provided with a structure which increases the surface. The methods of applying the interlayer and of increasing its surface, and also a material choice suitable therefor, have already been described. The thickness of the interlayer is approximately 1 to 10 particle layers and not more than approximately 10 μm in total.

The interlayers ZS may be applied to an electrolyte layer E which is present as green film or to an already presintered electrolyte layer E. Prior to the application of the electrode layers KA and AN, the electrolyte layer E embedded between the interlayers ZS is preferably sintered in order to fix the porous structure or at least the roughened or increased surface. The application of the electrode layers AN and KA is carried out as already described with reference to FIG. 1. It should also be borne in mind that different interlayers ZS may be provided for the different electrode layers.

FIG. 2 shows a further aspect according to the invention of the interlayer ZS, ZS'. At those edges of the ceramic film (or electrolyte layer E) which form the join region FB, the interlayer may be discontinued so that it does not have any connection to the internal layer regions of the interlayer ZS, ZS'. No electrode material is applied to this discontinued join region FB of the interlayer ZS, ZS', either, since it serves to receive the solder L in constructing the high-temperature fuel-cell stack. The join region FB may extend over all four edges of the electrolyte film or layer E.

Figure 3:
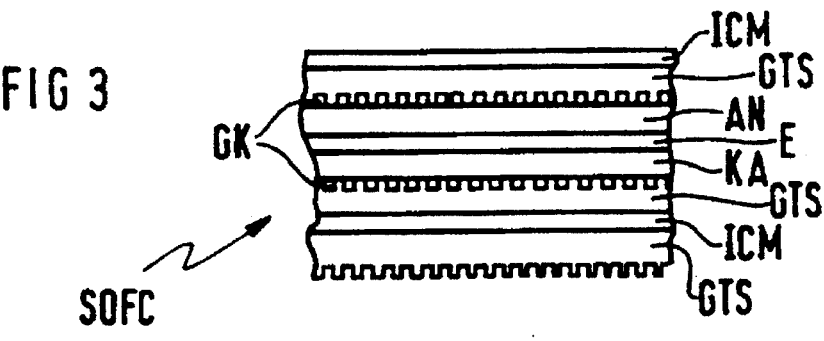
FIG. 3 shows a diagrammatic cross section through a fuel-cell stack.

FIG. 3 shows a diagrammatic cross section of a possible structure of a fuel-cell stack. In addition to the anode layer AN/electrolyte layer E/cathode layer KA composite already described having interlayers optionally present, essentially only gas-transport layers GTS are necessary for an individual fuel cell SOFC. In order to enable an adequate gaseous flow of fuel gases or of air respectively, through the gas-transport layers GTS, the latter are either suitably porous or, as shown in the figure, have gas channels GK. For an individual fuel cell, the material for the gas-transport layers GTS must resist only the operating conditions. For a fuel-cell stack, however, an electrical conductivity is additionally necessary which may advantageously also be accompanied by an ionic conductivity. Conventionally, the gas-transport layers GTS comprise the same material as the electrode layer AN or KA which is adjacent in each case.

The gas channels GK can be produced by extrusion of the corresponding green films. A porous layer can be achieved by adding spherules which can be burnt out to the slip needed to produce the gas-transport layers GTS. Particularly advantageously, however, the gas channels are produced after the lost-wax method, in which strips of plastics material which correspond to the desired shape of the gas channels and which can be burnt out are cast into and pressed into the green film.

The termination of the individual fuel cell or the connection to the adjacent individual cell in the stack is formed by a so-called bipolar plate, also referred to as ICM (interconnection material), which separates the gas spaces from one another in a gastight manner and ensures the electrical interconnection of the individual cells by means of electronic conductance. The ICM may comprise a suitable ceramic composition or be formed as a metallic bipolar plate. It is also possible to incorporate the gas channels in a metallic bipolar plate. A ceramic ICM is formed as thinly as possible and can be connected to the adjacent gas-transport layers GTS to form a composite body to increase the stability.

Mounted on top of the bipolar plate is the next individual cell, the orientation of anode and cathode layers being chosen so that a series interconnection of the individual cells is achieved. An ICM therefore adjoins both a gas-transport layer GTS conducting fuel gases and a gas-transport layer GTS with air flowing through it.

The number of individual cells layered on top of one another in a fuel-cell stack is optional, but can be adjusted so that either a maximum efficiency, a maximum power or good mechanical properties and long-term stability are provided.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A high-temperature solid-electrolyte fuel cell of planar multilayer design having ceramic films formed as gas-transport, electrode and electrolyte layers, comprising:

an electrolyte layer embedded between first and second electrode layers and having an anode side and a cathode side;

first and second electronically and ionically conducting interlayers having increased surface located between the electrolyte layer and first and second interlayers, respectively;

the first interlayer on the anode side being selected from titanium-doped or niobium-doped zirconium oxide and niobium-doped or gadolinium-doped cerium oxide; and the second interlayer on the cathode side being approximately 1 to 3 μm thick and composed of an ionically and electronically conducting cathode material.

2. The fuel cell as claimed in claim 1, wherein for each of the first and second interlayers, a respective interlayer thereof has a peripheral join region that is separated from internal layer regions of the respective interlayer, the join region serving to receive solder in constructing a high-temperature fuel-cell stack.

3. A method of producing a multilayer structure composed of an electrolyte layer, the electrolyte layer having on each side thereof an electrode, which forms an anode layer and cathode layer, respectively, for a planar high-temperature solid-electrolyte fuel cell, comprising the steps of:

applying a ceramic interlayer, which has an increased surface and which is composed of an ionically and electronically conducting material, to at least one smooth surface of the electrolyte layer;

applying one of an anode layer and a cathode layer on top of the interlayer;

jointly sintering the interlayer and the electrode layer;

selecting an interlayer on the anode side from titanium-doped or niobium-doped zirconium oxide and niobium-doped or gadolinium-doped cerium oxide; and forming an interlayer on the cathode side from an ionically and electronically conducting cathode material.

4. The method as claimed in claim 3, wherein the the ceramic interlayer is a porous interlayer composed of yttrium-stabilized, titanium-doped or niobium-doped zirconium oxide and is located between the electrolyte layer and the anode layer and is subsequently impregnated with nickel in pores thereof.

5. The method as claimed in claim 4, wherein the impregnation of the pores is carried out by chemical or electrochemical methods.

6. The method as claimed in claim 4, wherein the impregnation is carried out in an atmosphere containing gaseous nickel compounds.

7. The method as claimed in claim 3, wherein the method further comprises incorporating particles composed of a material, which can be burned out, in the ceramic interlayer and are burned out again by sintering, in which process the surface of the interlayer is increased.

8. The method as claimed in claim 3, wherein the interlayer is applied by a sol/gel method and is made to "break up" by calcination and sintering, in which process the surface of the interlayer is increased.

9. The method as claimed in claim 3, wherein the interlayer is applied by screen printing.

10. The method as claimed in claim 3, wherein the interlayer is applied in a thickness of 1–10 particle layers.

11. The method as claimed in claim 3, wherein the interlayer is applied in a thickness that is less than approximately 10 µm.

12. A high-temperature solid-electrolyte fuel cell of planar multilayer design having ceramic films formed as gas-transport, electrode and electrolyte layers, comprising:

an electrolyte layer is embedded between first and second electrode layers and having an anode side and a cathode side;

at least one electronically and ionically conducting interlayer having increased surface and located between the electrolyte layer and at least one electrode layer of the first and second electrode layers, said interlayer having a peripheral join region that is separated from internal layer regions of said interlayer, the join region serving to receive solder.

13. The method as claimed in claim 12, wherein the interlayer is located between the electrolyte layer and the first electrode layer on the anode side, and wherein the interlayer is selected from titanium-doped or niobium-doped zirconium oxide and niobium-doped or gadolinium-doped cerium oxide.

14. The method as claimed in claim 12, wherein the interlayer is located between the electrolyte layer and the electrode layer on the cathode side, and wherein the interlayer is approximately 1 to 3 µm thick and composed of an ionically and electronically conducting cathode material.

* * * * *